April 1, 1969    D. F. COLE ET AL    3,436,271
METHOD OF IMPROVING THE PERFORMANCE OF FUEL CELLS
Filed July 7, 1965

INVENTORS
DAVID F. COLE
ISAAC TRACHTENBERG
ATTORNEY

United States Patent Office 3,436,271
Patented Apr. 1, 1969

3,436,271
METHOD OF IMPROVING THE PERFORMANCE OF FUEL CELLS
David F. Cole and Isaac Trachtenberg, Dallas, Tex., assignors to Texas Instruments Incorporated, Dallas, Tex., a corporation of Delaware
Filed July 7, 1965, Ser. No. 470,115
Int. Cl. H01m 29/02, 23/00
U.S. Cl. 136—86                12 Claims

ABSTRACT OF THE DISCLOSURE

Disclosed is a method of improving the performance of fuel cells which comprises passing a current through the cell from an external source in the same direction that the current is produced by the normal electrochemical action of the cell for a period of time no less than the time required for the rate of change of voltage of the anode of the cell with respect to time at constant current to pass from a negative value to a value no less than zero. The fuel cell is preferably of the molten carbonate electrolyte type.

---

This invention relates to a method of improving the performance of fuel cells, and more specifically, to a method of increasing the power output of a fuel cell at a given cell voltage.

In the operation of fuel cells, it is commonly noted that performance decreases after a period of operation. Moreover, in some instances, a cell does not initially establish a good performance level.

The object of the present invention is to simply but effectively remedy such problems by restoring or improving the performance characteristics of a cell. It is a specific object to provide a method for increasing the power output of a cell at any given cell voltage.

In accordance with the present invention, current from an external source is passed through a fuel cell. The current is passed through the cell so that it flows in the same direction as current produced by the cell through its normal electrochemical reaction. Such current is passed through the cell until cell polarization levels off, and preferably until depolarization begins to occur. A voltage versus time curve of the anode of the cell, at constant current, may be used to determine such conditions since such curve has a slope of substantially zero at the time that polarization has leveled off. As depolarization occurs, the curve then commences to rise, i.e., the curve has a positive slope.

At the outset, it is believed important to point out that the method of the present invention cannot be analogous to the simple charging of a battery. When a battery is charged, the flow of current passed through it is directed opposite to the direction that current flows which is produced by the normal electrochemical reaction of the battery. By way of contrast, and quite surprisingly, the practice of the present invention provides for passing current from an external source through the cell in the *same* direction that the current flows which is produced by the cell from its normal power producing electrochemical reaction.

For a more complete understanding of the present invention and for further objects and advantages thereof, reference may now be had to the following description taken in conjunction with the accompanying drawings in which.

Figure 2:
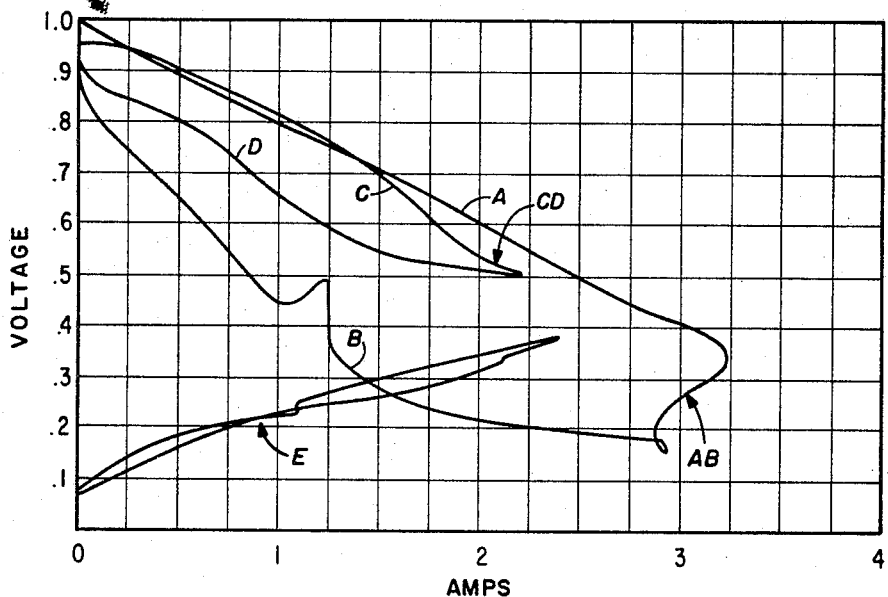
FIGURE 2 is a typical voltage versus amperage curve, indicating the performance of a cell of the general nature of that illustrated in FIGURE 1 prior to the time that the method of the present invention is practiced to improve cell performance.
Figure 3:
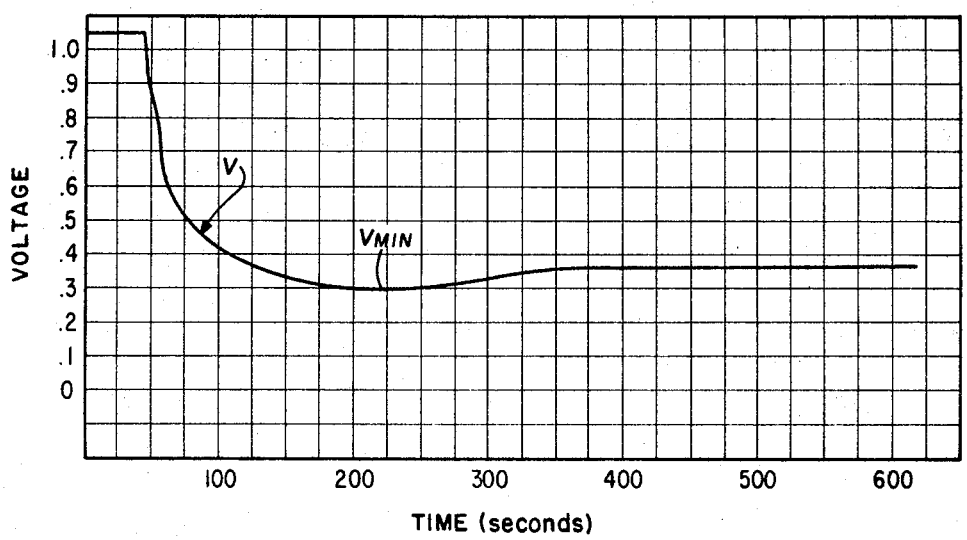
Figure 4:
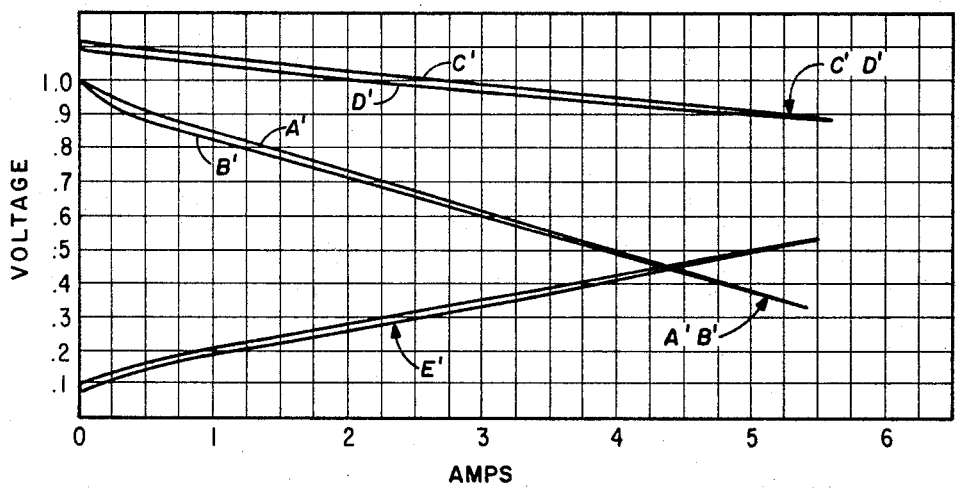

FIGURE 3 is an anode voltage versus time curve, at constant current, of the same cell involved in FIGURE 2, but taken during the period of time that current is being passed through that cell in accordance with the method of the present invention; and FIGURE 4 is a voltage versus amperage curve of the same cell involved in the data of FIGURE 2, but taken after practice of the method of the present invention.

Figure 1:
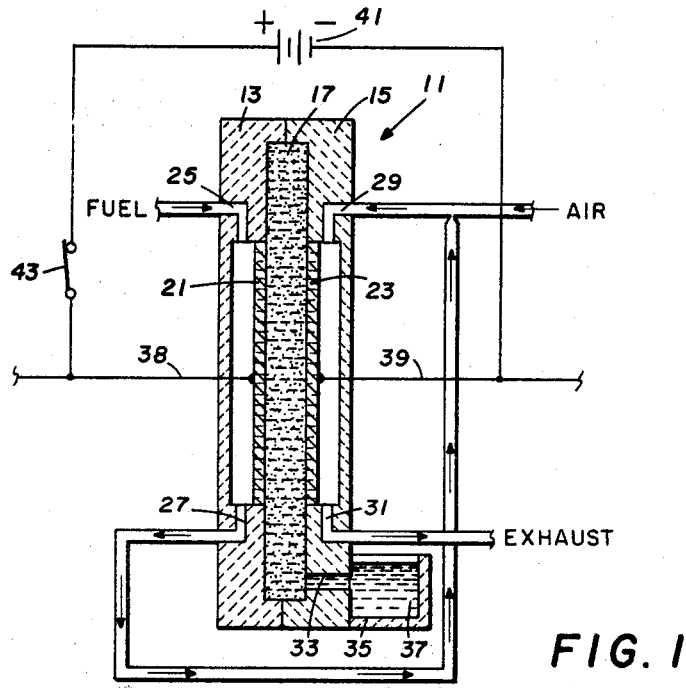
FIGURE 1 is an elevational sectional view, rather schematic in nature, of a molten carbonate type fuel cell which is having current passed through it, in accordance with the method of the present invention.

Referring now to FIGURE 1, therein a fuel cell is illustrated generally at 11. It is to be understood that the detail of such fuel cell 11 is treated herein merely for explanatory purposes and that the various physical features of this specific cell do not in themselves constitute a part of the present invention.

In FIGURE 1, fuel cell 11 has an outer casing made up of the two casing halves 13 and 15. Fine magnesium oxide powder 17 is centrally contained within the casing halves 13 and 15. Power 17 is permeated with a sodium-lithium carbonate eutectic mixture in molten state, the cell being maintained at a temperature above the melting point of the sodium-lithium carbonate. The powder 17 is disposed between porous sintered electrode 21, which is carried by casing half 13, and porous sintered electrode 23, which is carried by casing half 15. The electrodes 21 and 23 may be supported by conventional means (not illustrated), e.g., they may be supported by shoulders or grooves, in their respective casing halves, which engage the edges of the electrodes. Bonding means, such as flame spray technique, may also be utilized to join the electrodes to the casing halves.

Fuel inlet 25 and spent fuel outlet 27 are provided in casing half 13, and air inlet 29 and exhaust passage 31 are provided in casing half 15.

The lower portion of the casing half 15 is provided with a bore 33 which extends through the thickness of casing half 15, permitting communication between the lower portion of the magnesium oxide powder 17 and the exterior of the casing half. A ceramic cup 35 extends from the lower exterior face portion of the casing half 15, with the outermost portion of bore 33 opening into it. Within this ceramic cup structure 35, molten carbonate electrolyte 37 is stored. This electrolyte is maintained at a level in excess of the level of bore 33 and, consequently, serves as a supply source of electrolyte to magnesium oxide powder 17, which is fed by a wicklike action to cause a slurry of magnesium oxide powder and electrolyte to be maintained between and in contact with the electrodes 21 and 23.

Suitable wires 38 and 39 are conductively joined with the electrodes 21 and 23, and pass through the casing halves 13 and 15, respectively, to connect with an external circuit.

In operation, a fuel gas, e.g., hydrogen gas or a mixture of hydrogen and various carbon compounds obtained by cracking a hydrocarbon, is fed into the fuel cell of FIGURE 1 through inlet 25, wherein it passes adjacent and partially permeates the pore structure of the electrode 21. Spent fuel gas thereafter passes out of the cell through conduit 27 to join oxidizer (e.g., air) being fed into the fuel cell 11, through air inlet 29, to the electrode 23. The spent fuel provides carbon dioxide for electrode 23. The air and spent fuel mixture pass adjacent and partially permeate pore structure of electrode 23. The exhaust from electrode 23 discharges through exhaust passage 31. The sintered electrodes 21 and 23 provide interfaces between the fuel and electrolyte, and the air-carbon dioxide mixture and electrolyte, respectively.

The reaction at the fuel electrode 21, i.e., at the anode, is as follows:

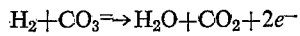

The reaction at the air electrode 23, i.e., at the cathode, is as follows:

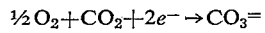

In practice, the operation of the fuel cell of FIGURE 1 is normally at a temperature well in excess of about 500° C., e.g., at about 650° C., in order to maintain the sodium-lithium carbonate eutectic in liquid state and operate at a high performance level.

In addition to the principal reactions at the anode and cathode which were referred to above, certain side reactions occur. Various reactions that tend to block the principal reactions of the cell appear to be included among such side reactions.

Referring further to FIGURE 1, the method of the present invention by which cell performance is increased will now be described. A D.C. source 41 is connected to the leads 38 and 39 by suitable circuitry, including a switch 43 which is left in the open position except during the comparatively short periods when the present method is being practiced. On the closing of the switch 43, it will be noted that the cathode of the source 41 is connected to the anode of fuel cell 11 and that the anode of source 41 is connected to the cathode of fuel cell 11. The external load circuit is disconnected from the cell, as by a suitable conventional switch (not illustrated). The D.C. source 41 will pass current through the fuel cell system in the normal direction of current flow therethrough. This current is passed at a sufficient level and for a sufficient time to cause polarization of the cell's anode to occur. Such polarization levels off and is followed by the commencement of depolarization. At the time that polarization has leveled off, and preferably after depolarization has commenced to occur, the current passing from the external source is discontinued by opening the switch 43. It is surprisingly found that a substantial improvement in cell performance results. This improvement is immediate and of substantial duration. Normally, the amount of improvement initially noted increases for some time, until a maximum improvement is finally achieved.

Referring to FIGURE 2, voltage versus amperage curves are shown therein which indicate the performance of a cell of the general type described in connection with FIGURE 1. Data for these curves are taken after a substantial number of hours of cell operation have occurred, and before practice of the method of the present invention. The curve identified generally as AB indicates overall voltage versus amperage data obtained in a test of 15 minutes duration, during which an external load was regularly varied until 7½ minutes had passed, and then, in analogous manner, varied in reverse direction in accordance with the same load values. The declining voltage-amperage curve so obtained is indicated by the portion of curve AB which is captioned A on FIGURE 2. The rising voltage-amperage curve so obtained is indicated by the portion of the curve AB captioned B on FIGURE 2. It will be nothed that comparison of curve portion A and curve portion B indicates substantially less power performance characteristics of the cell in the latter case. Such wide variation of the paths followed by curve portions A and B might be rather loosely described as a hysteresis loss, and it will be noted that such hysteresis loss is pronounced in the curve AB.

FIGURE 2 also shows the voltage versus amperage curve CD of the anode of the cell, the falling voltage curve being identified by the letter C, and the rising voltage curve (on reversal of the variation of values of the constantly varied external load) by the letter D. Hysteresis loss is readily observed to be substantial. It should be noted that the curve CD was obtained by referring the anode 21 to a metallic electrode disposed in the electrolyte 37 carried in electrolyte cup 35. This reference electrode is referred to hereinafter as an "idling electrode" or a "reference electrode."

In like manner, a cathode voltage-amperage trace is indicated on FIGURE 2 for the same cell and under the same test characteristics utilized to obtain data for curves AB and CD. It will be noted that the rising and falling curves involved lie quite close together, the overall curve being identified by the single letter E. Since the curves follow almost the same path, it is apparent that little hysteresis loss effect is indicated.

The cell tested to yield the data evidenced by FIGURE 2 is next treated in accordance with the method of the present invention. This was accomplished in the manner indicated in connection with the discussion of FIGURE 1, i.e., closing of switch 43. A voltage-time trace was taken of the cell, under conditions of constant current applied by the external D.C. source 41. This trace is indicated by the curve identified as V in FIGURE 3. Note that current passage from the external source was started at about 45 seconds, and that voltage immediately began to drop. The drop in voltage was at first quite sharp, but by the passage of about 50 seconds from the start of the current from an external source, a substantial tendency to level off was evidenced. After a lapse of about 150 seconds (see the 200 second total lapse time point on the abscissa scale) voltage had leveled off, as indicated at the curve region identified by the designation $V_{MIN}$. Voltage thereafter began to rise. Finally, a leveling occurred again in the voltage-time curve at a voltage value somewhat greater than the minimum voltage reached.

The rate of change of voltage with respect to time, the slope of the curve of FIGURE 3, would appear to be significant in indicating the change in polarization type phenomena occurring. At first, when current is passed through the cell a considerable polarization effect is experienced, the rate of change of voltage versus time being negative and rather substantial in value, as is evidenced from the slope of curve V. On continued passage of constant current, it is observed from change in slope of curve V that the rate of change in voltage with respect to time finally reaches zero and then begins to increase to positive values, though comparatively slowly. It has been found, as will be further demonstrated by the comparison of FIGURE 4 to FIGURE 2 and subsequent discussion herein, that marked cell improvement results after current is passed for at least so long as is necessary to cause polarization to level off, i.e., for rate of change of voltage versus time at constant current to become substantially zero, e.g., as indicated at $V_{MIN}$ on curve V, FIGURE 3.

FIGURE 4 illustrates curves of voltage versus current, at regularly varied external load, in accordance with the same load variation pattern and test set-up used in conjunction with obtaining the data of FIGURE 2 and on the same cell therein involved. However, the cell test data are taken after passing current through the cell in accordance with the present invention, as discussed in connection with FIGURE 3. After the passage of current in conformance with the voltage-time curve of FIGURE 3, the overall cell was subjected to a voltage-amperage test, as were the cathode and the anode, both being compared to an idling electrode. The nature of the data obtained is indicated by the curves A'B', C'D', and E', which are identified in analogous manner to the like curves of FIGURE 1, except for addition of the character prime to distinguish. It will be observed that curve portions A' and B' lie almost along the same line, thus indicating little of the hysteresis loss effect observable before practice of the present invention. The same is true of curve portions C' and D' applicable to the anode voltage of the cell. The curve E' applicable to the cathode voltage continues to show little evidence of hysteresis, being similar in configuration to the "before" curve E of FIGURE 2.

Specific instances of cell performance improvement by practice of the present invention are given by the following examples, which are intended merely for purposes of illustration and not to be taken as limiting:

EXAMPLE 1

A cell of the type illustrated in FIGURE 1, utilizing a 50%–50% molar eutectic mixture of molten sodium-lithium carbonate electrolyte is operated for 364 hours at 650° C. The anode utilized was of nickel and the cathode of silver. The fuel is a mixture of wet hydrogen and carbon oxides (80% by volume of hydrogen saturated with water vapor and 20% carbon dioxide) and the oxidizer is air, which has fuel exhaust $CO_2$ mixed with it as illustrated and explained in connection with FIGURE 1.

At the end of the 364 hours, the maximum power output (occurring at .5 volt) is 18.2 watts/ft.$^2$. A constant current of 5 amps is then passed through the cell for 550 seconds, at which time the anode voltage versus time curve is observed to achieve a zero slope, indicating that polarization has leveled off, as previously explained herein. Thereafter, the operation of the cell is continued at 650° C. After 4 hours (at total of 368 hours operation) a maximum power output (occurring at .5 volt) is found to be 38.8 watts/ft.$^2$.

EXAMPLE 2

The cell of the same type involved in Example 1 is operated for 458 hours at 650° C. At the end of this time, its maximum power output is 22.1 watts/ft.$^2$. At this time, a constant current of 5 amps is passed through the cell, in the manner previously explained herein, for a total of 40 minutes. After 2 hours of cell operation, from time of completion of the passage of current, the maximum power output is found to be 35.3 watts/ft.$^2$. Surprisingly, after one additional hour operation, the maximum power output is found to have raised to a value of 42.4 watts/ft.$^2$.

EXAMPLE 3

The procedure of Example 2 is repeated on a cell of the same type therein involved. The cell has a maximum power output of 23.0 watts/ft.$^2$ after 170 hours operation at 650° C. At this time, a constant current of 5 amps is passed through the cell for 10 minutes, followed by passing 6 amps through the cell for 2 minutes, 6½ amps through the cell for 18 minutes and 7 amps through the cell for 5 minutes. The cell is thereafter operated for 7 hours (giving a total operational time of 177 hours) at 650° C. At the end of this time, the maximum power output is found to be 62.8 watts/ft.$^2$.

It is not known with certainty why the present invention works to increase cell performance and, accordingly, it is not intended or desired that the invention be in any way limited by theoretical speculation. However, it is believed that the improved performance characteristics of the practice of the present invention are due to removal of substances from the anode surfaces which limit or obstruct the area of the electrode available for the cell's power producing electrochemical reaction. It appears that this removal may be effected by a potential-dependent desorption or by electrolytic oxidation, or by a combination of electrolytic oxidation and a subsequent desorption. In this way a greater electrode area would become available.

It should be noted that the period of time which current is passed through the cell does not appear critical as long as a certain minimum period of current passage is provided. The end of the minimum period is determined by the time at which the anode voltage (which may be measured with respect to a reference electrode, as explained herein) passes through a minimum value and desirably begins to increase.

Current value in itself is not critical in the practice of the present invention; however from about 100 to 300 amps per square foot (of electrode surface area) is in a typical range.

Surprisingly, it is found that a maximum improvement of cell performance may not be experienced immediately after passage of current in accordance with the present invention. For example, in numerous cases it has been observed that the improvement in performance reaches its maximum several hours after current is passed through the cell in accordance with the present invention. This increase in improvement is probably the result of the time requirements for diffusional processes to operate in the cell.

The present invention may be practiced either while fuel and oxidizer are being supplied the electrodes, or while such supply is shut off.

It is not necessary in all instances to disconnect a cell's external load in order to practice the present invention. Thus, if the power source for producing current to pass through the cell is placed in series (as contrasted to the parallel arrangement illustrated in FIGURE 1), the external load need not be disconnected from the cell.

The preferred practice of the present invention is with the type of fuel cells which employ a constituent comprising carbon in the vicinity of the anode, i.e., in the fuel and/or in the electrolyte. Exemplary of such cells are (1) the molten carbonate type, and (2) the acid electrolyte type employing carbon containing compounds as fuel.

It should be appreciated that the characteristic essential feature of the present invention includes the step of passing current through a cell in the direction in which current ordinarily flows as a result of cell operation when the cell is operating in its normal manner.

Having described the invention in connection with certain specific embodiments thereof, it is to be understood that further modifications may now suggest themselves to those skilled in the art and it is intended to cover such modifications as fall within the scope of the appended claims.

What is claimed is:

1. The method of improving the performance of a fuel cell comprising passing a current through the cell from an external source, said current being passed in the direction that current is produced by the normal electrochemical action of said cell and for at least a period of time sufficient for anode polarization of said cell to reach a maximum value.

2. The method of claim 1 in which said current is passed until at least some depolarization of said anode occurs.

3. The method of improving the performance of a fuel cell comprising passing a current through the cell from an external source, said current being passed in the direction that the current is produced by the normal electrochemical action of said cell and for a period of time no less than the time required for the rate of change of voltage of the anode of said cell with respect to time, at constant current, to pass from a negative value to a value no less than zero.

4. The method of claim 3 wherein the said rate of change of voltage of the anode of said cell with respect to time, at constant current, changes from a negative value to a positive value before the passage of said current is discontinued.

5. The method of claim 3 in which said cell is of the molten carbonate electrolyte type.

6. The method of improving the performance of a fuel cell of the type having a constituent comprising carbon in the vicinity of the anode comprising:

passing a current through the cell from an external source while feeding fuel and oxidizer to the anode and cathode, respectively, said current being passed in the direction that current is produced by the normal electrochemical action of said cell and for at least a period of time sufficient for anode polarization to reach a maximum value.

7. The method of improving the performance of a fuel cell having an anode, a cathode, and an electrolyte, said cell being of the type having a constituent comprising carbon in the vicinity of the anode, comprising:

passing a current through the cell from an external source while feeding fuel and oxidizer to the anode and cathode, respectively, said current being passed in the direction that the current is produced by the normal electrochemical action of said cell and for a period of time no less than the time required for the rate of change of voltage of the anode or said cell with respect to time, at constant current, to pass from a negative value to a value no less than zero.

8. The method of claim 7 wherein the said rate of change of voltage of the anode of said cell with respect to time, at constant current, changes from a negative value to a positive value before the passage of said current is discontinued.

9. The method of claim 8 in which said cell is of the molten carbonate electrolyte type.

10. The method of claim 9 in which the fuel for said cell comprises a gaseous mixture containing hydrogen and a constituent comprising carbon.

11. The method of claim 9 in which the electrolyte of said cell is sodium-lithium carbonate.

12. The method of claim 9 in which said electrolyte is disposed to form a slurry with a multiplicity of small dielectric particles.

References Cited

UNITED STATES PATENTS

| 3,180,813 | 4/1965 | Wasp et al. | 136—86 |
| 3,207,682 | 9/1965 | Oswin et al. | 204—140 |
| 3,134,697 | 5/1964 | Niedrach | 136—86 |
| 3,355,326 | 11/1967 | Semones et al. | 136—120 X |

WINSTON A. DOUGLAS, *Primary Examiner.*

M. J. ANDREWS, *Assistant Examiner.*